United States Patent Office 3,442,908
Patented May 6, 1969

3,442,908
6-DIALKYLAMINOFLUORANS
Michio Orita and Masakichi Yahagi, Tokyo, and Chiyouzi Enomoto, Urawa-shi, Japan, assignors to Nisso Kako Co., Ltd., a corporation of Japan
No Drawing. Filed Dec. 2, 1966, Ser. No. 598,590
Claims priority, application Japan, Dec. 9, 1965, 40/75,326; June 14, 1966, 41/37,984; Oct. 15, 1966, 41/67,428; Nov. 7, 1966, 40/72,839
Int. Cl. C07d 7/42; D21h 1/10
U.S. Cl. 260—335                                                   3 Claims

ABSTRACT OF THE DISCLOSURE

Substituted 6-dialkylaminofluorans prepared by heating 4-dialkylamino-2-hydroxy-2′-carboxybenzophenone and an appropriate phenol in the presence of a dehydrating agent. They are useful as an essential component in color-developable coating compositions.

---

This invention relates to color-developable coating compositions and compounds useful therein. More particularly the present invention is concerned with color-developable coating compositions containing, as an essential component, a lactone compound having the after-specified chemical structure.

Lactone compounds useful in the coating compositions of the present invention can be represented by the following chemical formula

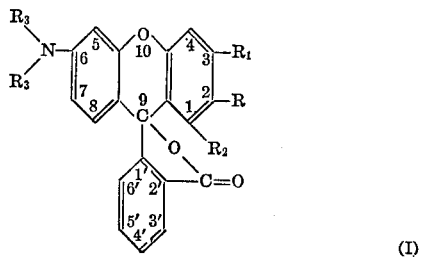

(I)

wherein R is chlorine or methyl; one of $R_1$ and $R_2$ is chlorine or methyl and dissimilar to the R, and the other is hydrogen, chlorine or methyl, and $R_3$ is lower alkyl.

These lactone compounds are new compounds which have never been disclosed in the prior art literatures. They are substantially colorless crystalline and can show dense and clear vermilion color when they are brought into contact with an electron-accepting substance, e.g. active clay, acid clay, bentonite, kaolin, talc, aluminum silicate, calcium citrate, metal oxides (the oxides of zinc, titanium, aluminum, arsenic and the like) and metal chlorides (zinc chloride, aluminum chloride, stannous or stannic chloride and antimony chloride). Color formation of such lactone compounds may occur where the lactones in crystalline form are contacted with an acid in vapor or solution phase, or where the lactones dissolved in an organic solvent, e.g. benzene, toluene, chlorinated biphenyl, etc. is contacted with clay. This makes it possible to use the lactone compounds as color-forming component in so-called pressure-sensitive duplicating media. For example, a lactone compound of the chemical formula (I) in admixture with a wax (e.g. carnauba wax, cadelliba wax, paraffin wax, etc.) is coated on a suitable support (e.g. paper, cloth, plastic film, etc.). Alternatively, the lactone compound dissolved in an appropriate solvent (e.g. chlorinated paraffin, chlorinated biphenyl, various types of paraffin oils, spindle oil, terpene oil, dibutyl phthalate, dioctyl phthalate, or vegetable oils such as olive, cotton seed, peanut or caster oil) is encapsulated with gelatine and/or gum arabic thereby to have individually separate fine particles (so-called microcapsules), which are then carried on a support. In addition to the gelatine and gum arabic, typical suitable encapsulating materials include casein, tragacanth gum, methyl cellulose, ethyl cellulose, starch, cellulosic fiber, sodium alginate, urea-Formalin resin, etc. The coated surface is placed in contact with another sheet on which white clay or the like electron-accepting adsorbent material has been coated. To the assembly, localized pressure is applied. In a duplicating media of the former type, the lactone compound which exduates from the wax layer contacts with white clay. In that of the latter type, the solution of the lactone compound which is flown out from the destroyed capsule contact with white clay. Thus, red color is developed on the clay-coated surface. It is to be understood that the lactone compound can be used in admixture with one or more suitable other color-formable compounds, e.g. Crystal Violet Lactone (blue), Benzoyl Leuco Methylene Blue (greenish blue), etc., so as to obtain any desired color tone.

In the prior art, there are known some compounds which may be used in pressure-sensitive copying papers, said compounds having any one of the following formula:

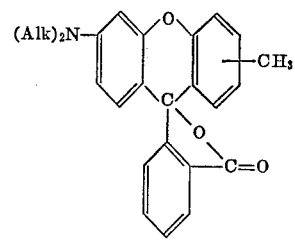

(II)

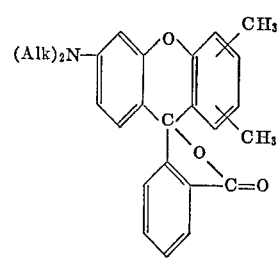

(III)

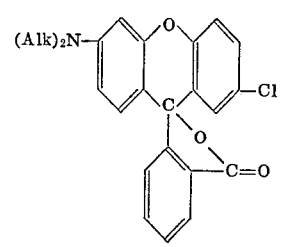

(IV)

The compounds (II) and (III) have disadvantages that when used as color-formable component they contaminate capsules to undesired red color because they are more or less soluble in water. Further, they have a relatively high vapor pressure so that they tend to vaporize from the capsules to redden clay-coated surface when they are maintained in contact with said surface even without any local pressure. In contrast to this, a lactone compound of the present invention which is insoluble in water and very low in vapor pressure does not contaminate capsules during their preparation and does not vaporize from the prepared capsules. Furthermore a known compound of the above Formula IV only show pale color when brought into contact with clay, whereas a lactone compound of this invention can give highly dense and clear color formation. Thus, the present invention is technically advantageous over the prior art.

Lactone compounds used herein can be prepared by heating 4-dialkylamino-2-hydroxy - 2'-carboxybenzophenone and an appropriate phenol at an approximately equimolar proportion in the presence of a dehydrating agent such as sulfuric acid. The reaction which takes place herein will be indicated by the following equation:

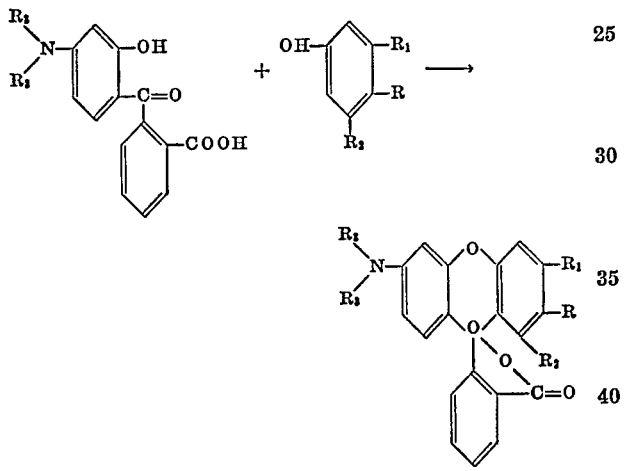

The following examples describe certain ways in which the principle of the invention has been applied, but are not to be construed as limiting its scope.

Example 1

Ten grams of 4-dimethylamino - 2-hydroxy-2'-carboxybenzophenone and 5.0 g. of 4-chloro-3-methylphenol together with 50 g. of 70% sulfuric acid are heated, with stirring, at a temperature of 130°–140° C. for 4 hours. After allowing to cool, the resulting reaction mixture is poured into 280 cc. of 10% aqueous sodium hydroxide. The crystalline mass is separated by hot filtration, and it is washed well with water and then dried. Recrystallization from toluene-acetone gives 4.1 g. of a substantially colorless crystalline product which has a melting point of 220°–223° C. This is identified as having the following structural formula:

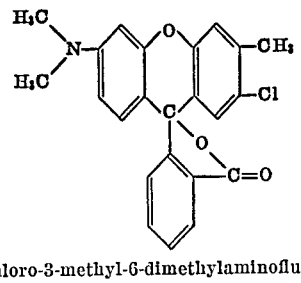

2-chloro-3-methyl-6-dimethylaminofluoran 5.0 g. of the above compound is dissolved in 80 g. of trichlorinated biphenyl with heating to give a solution. On the other hand, a solution of 10 g. of gelatine (with an isoelectric point of 8.0) in 160 g. of water and then adjusted to pH 8.0 by addition of 5% aqueous sodium hydroxide. The thus prepared second solution is stirred at high speed and thereto the first solution is added to effect emulsification. A solution of 20 g. of gum arabic in 160 g. of water which solution is preadjusted at pH 8.0 is also added to the emulsion. While continuing high speed agitation of the emulsion, 5% acetic acid is added to make the pH value of said emulsion to 5.0. 500 cc. of water is added to the total emulsion thereby to lower its pH to 4.4. After further addition of 3.8 g. of 37% formalin, the emulsion is cooled to 10° C. and adjusted to pH 9.0 with 5% aqueous sodium hydroxide. After standing for several hours, a white emulsion is obtained, which includes very fine particles (so-called capsules) in which a solution of the above lactone compound in trichlorinated biphenyl is encapsulated with coating of gelatine-gum arabic. This white emulsion is coated on a paper and then dried. The coated surface of this paper is brought into contact with the clay-coated surface of another paper. When letters or figures are impressed onto the emulsion-coated paper, clear vermilion copy is obtained on the clay-coated paper.

Example 2

The synthetic procedures given in Example 1 are repeated with excepting that 5.5 g. of 4-chloro-3,5-dimethylphenol is used instead of the 4-chloro-3-methyl-phenol, thereby to obtain 3.0 g. of a colorless crystalline product which has a melting point of 235°–236° C. and which is represented by the following formula:

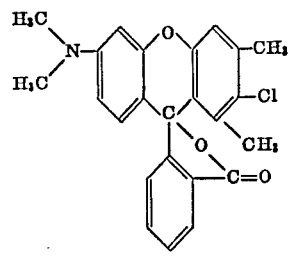

2-chloro-1,3-dimethyl-6-dimethylaminofluoran

This compound is dissolved in trichlorinated biphenyl and prepared according to the procedures given in Example 1. The resulting white emulsion is used for preparation of copying-paper in the same manner as in Example 1.

Example 3

The synthetic procedures given in Example 1 are repeated with exception that 5.0 g. of 3-chloro-4-methyl phenol is used instead of the 4-chloro-3-methyl phenol of Example 1, thereby to obtain 3.5 g. of a colorless crystalline compound (M.P. 252°–254° C.) which is represented by the formula:

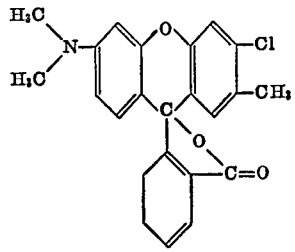

3-chloro-2-methyl-6-dimethylaminofluoran

This compound is useful for the preparation of a color-developable coating composition according to the procedures described in the latter half of Example 1.

Example 4

26 g. of 4-diethylamino-2-hydroxy - 2' - carboxybenzophenone and 12.5 g. of 4-chloro-3-methylphenol are mixed with 130 cc. of 70% sulfuric acid. The mixture is heated at 120°–130° C. for 5 hours. After cooling, this mixture is gradually poured into 1200 cc. of 10% aqueous sodium hydroxide. The crystalline mass is separated by hot filtration and then washed with water until washings become neutral. Drying gives crude product as desired. It is dissolved in hot toluene and the resulting solution is treated with active carbon and then filtered while hot. The filtrate obtained is kept in a cold dark place. The precipitated crystalline product is collected by filtration and then washed with acetone. 14.5 g. of lactone having the formula:

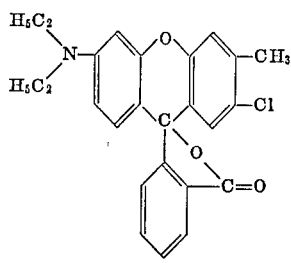

2-chloro-3-methyl-6-dimethylaminofluoran is obtained as substantially colorless crystalline needles having a melting point of 235° C.

100 g. of carnauba wax is mixed with 50 g. of dibutyl phthalate by heating at 80°–90° C. To the resulted mixture, 5 g. of the above lactone compound is dissolved with well agitation. The resulting emulsion is coated on a paper and then dried. The emulsion-coated surface of this paper is brought into contact with the clay-coated surface of another paper. Impression on the former paper gives clear reproduction of the corresponding image on the clay-coated surface.

Example 5

The synthetic procedures given in Example 4 are repeated with exception that 13.3 g. of 4-chloro-3,5-dimethyl-phenol is used instead of 4-chloro-3-methylphenol used in Example 4, thereby to obtain 13.5 g. of a colorless crystalline compound, with a melting point of 197.5°–199° C., which is represented by the formula:

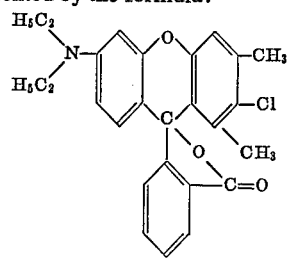

2-chloro-1,3-dimethyl-6-diethylaminofluoran

This compound is useful for the preparation of a color-developable coating composition according to the procedures described in the latter half of Example 1 or Example 4.

Example 6

The synthetic procedures given in Example 4 are repeated with exception that 12.8 g. of 3-chloro-4-methyl phenol is used instead of the 4-chloro-3-methyl phenol of Example 4, thereby to obtain a colorless crystalline compound (M.P. 196.5–198° C.) which is represented by the formula:

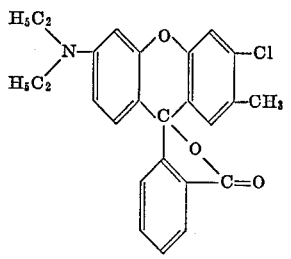

3-chloro-2-methyl-6-diethylaminofluoran

This compound is useful for the preparation of a color-developable coating composition according to the procedures described in the latter half of Example 1 or Example 4.

Example 7

9.2 g. of 4-di-n-butylamino-2-hydroxy-2'-carboxybenzophenone (M.P. 182°–183° C.) and 3.5 g. of 4-chloro-3-methyl phenol together with 46 g. of 70% sulfuric acid are heated, with stirring, at 120°–125° C. for 4 hours. After cooling, the resulting mixture is poured into 280 cc. of 10% aqueous sodium hydroxide. The crystalline mass is collected by hot separation, washed well with water and then dried. Recrystallization from toluene-acetone mixture gives 3.4 g. of a colorless crystalline compound, with M.P. 166°–167° C., which is represented by the formula:

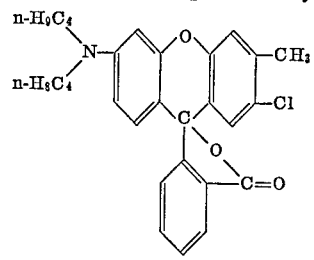

2-chloro-3-methyl-6-di-n-butylaminofluoran

This compound is useful for the preparation of a color-developable coating composition according to the procedures described in the latter half of Example 1 or Example 4.

Example 8

The synthetic procedures of Example 7 are repeated with exception that 3.5 g. of 3-chloro-4-methyl phenol is used instead of the 4-chloro-3-methyl phenol of Example 7, thereby to obtain 3.2 g. of a colorless crystalline compound, with M.P. 165°–166.5° C., which is represented by the formula:

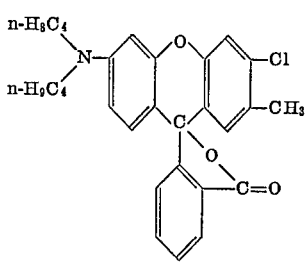

3-chloro-2-methyl-6-di-n-butylaminofluoran

Example 9

The synthetic procedures given in Example 7 are repeated with exception that 3.9 g. of 4-chloro-3,5-dimethyl phenol is used instead of the 4-chloro-3-methyl phenol of Example 7, thereby to obtain 2.5 g. of a colorless crystalline compound, with M.P. 164°–166° C., which is represented by the formula:

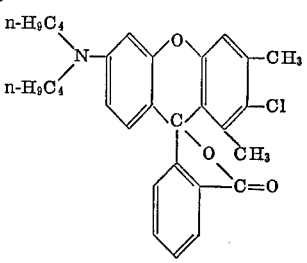

2-chloro-1,3-dimethyl-6-di-n-butylaminofluoran

This compound as well as that of Example 7 and Example 8 is useful for the preparation of a color-developable coating composition according to the procedures described in the latter half of Example 1 or Example 4.

What we claim is:

1. A compound having the following formula

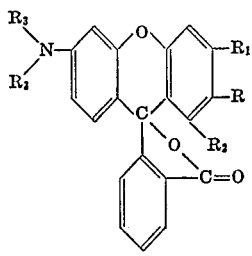

wherein R is chlorine or methyl; one of $R_1$ and $R_2$ is chlorine or methyl and dissimilar to the R and the other is hydrogen, chlorine or methyl; and $R_3$ is lower alkyl.

2. A compound as claimed in claim 1, wherein R is chlorine, $R_1$ is methyl, $R_2$ is hydrogen or methyl, and $R_3$ is methyl, ethyl, propyl or butyl.

3. A compound as claimed in claim 1, wherein R is methyl, $R_1$ is chlorine, $R_2$ is hydrogen or methyl, and $R_3$ is methyl, ethyl, propyl or butyl.

References Cited

UNITED STATES PATENTS 2,175,168  10/1939  Eckert et al. _____ 260—335

OTHER REFERENCES

Beilstein, vol. XIX, pp. 341, 342 (1934).

NORMA S. MILESTONE, *Primary Examiner.*

U.S. Cl. X.R.

106—287